United States Patent
Griffith et al.

(10) Patent No.: US 8,209,217 B1
(45) Date of Patent: Jun. 26, 2012

(54) AUTHOR-FOCUSED TOOLS FOR SCHEDULING AN EVENT ASSOCIATED WITH AN AUTHOR OR WITH A WORK OF THE AUTHOR

(75) Inventors: Victoria A. Griffith, Seattle, WA (US); Jeff L. Belle, Seattle, WA (US); Daniel Leng, Seattle, WA (US); Mark A. Winham, Mercer Island, WA (US); Adam J. Iser, Mercer Island, WA (US); Michael Anthony Frazzini, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 397 days.

(21) Appl. No.: 12/425,877

(22) Filed: Apr. 17, 2009

(51) Int. Cl.
- *G06Q 10/00* (2006.01)
- *G06Q 30/00* (2006.01)
- *G06Q 50/00* (2006.01)

(52) U.S. Cl. ............ 705/7.34; 705/7.12; 705/7.13; 705/7.29; 705/310; 705/347; 715/962

(58) Field of Classification Search ............ None
See application file for complete search history.

(56) References Cited

U.S. PATENT DOCUMENTS

| | | | | |
|---|---|---|---|---|
| 4,674,043 A * | 6/1987 | Hernandez et al. | ............ | 715/209 |
| 6,321,221 B1 | 11/2001 | Bieganski | | |
| 7,848,956 B1 | 12/2010 | MacLean | | |
| 2002/0123924 A1 * | 9/2002 | Cruz | ............... | 705/10 |
| 2002/0161664 A1 | 10/2002 | Shaya et al. | | |
| 2002/0165756 A1 | 11/2002 | Tobin et al. | | |
| 2002/0169657 A1 | 11/2002 | Singh et al. | | |
| 2002/0198699 A1 | 12/2002 | Greene et al. | | |
| 2003/0115097 A1 * | 6/2003 | Sokei et al. | ............... | 705/14 |
| 2003/0187802 A1 * | 10/2003 | Booth | ............... | 705/59 |
| 2005/0222888 A1 | 10/2005 | Hosoda et al. | | |
| 2006/0149616 A1 | 7/2006 | Hildick-Smith | | |
| 2006/0195356 A1 * | 8/2006 | Nerenhausen et al. | ........ | 705/14 |
| 2007/0198363 A1 | 8/2007 | Quoc et al. | | |
| 2008/0028300 A1 | 1/2008 | Krieger et al. | | |
| 2008/0046913 A1 * | 2/2008 | Dear | ............... | 725/24 |
| 2008/0097826 A1 | 4/2008 | Leach et al. | | |
| 2008/0154696 A1 * | 6/2008 | Spiegelman et al. | ........ | 705/10 |
| 2008/0300863 A1 | 12/2008 | Smith | | |
| 2009/0112680 A1 * | 4/2009 | Dovrath et al. | ............... | 705/9 |
| 2009/0138349 A1 * | 5/2009 | Drucker et al. | ............... | 705/14 |
| 2009/0150303 A1 * | 6/2009 | MacMillan et al. | ......... | 705/400 |
| 2009/0248542 A1 * | 10/2009 | Houvener et al. | ............. | 705/27 |

(Continued)

OTHER PUBLICATIONS

Teradata "Teradata Event-Based Communication Solution" (Date Unknown) (http://www.teradata.com/resources/brochures/Teradata-Event-Based-Communication-Solution-eb4598/).*

(Continued)

*Primary Examiner* — Lynda Jasmin
*Assistant Examiner* — Sujay Koneru
(74) *Attorney, Agent, or Firm* — Lee & Hayes, PLLC

(57) ABSTRACT

This disclosure describes a platform for better connecting authors and retailers that offer works of the authors for acquisition by a community of users. This platform includes multiple tools that allow the authors to provide content to the community of users through the retailer or through another entity. In addition, this platform provides tools that authors may utilize for marketing their works, for tracking acquisition (e.g., sales) of their works, for connecting with other authors, or for a multitude of other purposes.

19 Claims, 11 Drawing Sheets

U.S. PATENT DOCUMENTS

2010/0081457 A1* 4/2010 Jerome et al. .............. 455/456.3
2010/0161499 A1 6/2010 Holcombe et al.
2010/0325205 A1* 12/2010 Murphy et al. .............. 709/204

OTHER PUBLICATIONS

Author House "Planning, Promoting, and Conducting a Worthwile Book Signing" (Apr. 2009) (http://web.archive.org/web/20090418201302/http://www.authorhouse.com/AuthorResources/Marketing/Event/BookSigning.asp x).*

"BookTour: Where Authors and Audiences Meet", retrieved on Aug. 12, 2009 at <<http://www.booktour.com/>>, Booktour.com, entire website, 2 pages.

"FiledBy—Author websites, author directory, author search", retrieved on Aug. 12, 2009 at <<http://www.filedby.com/>>, filedby.com, entire website, 3 pages.

"LinkedIn", retreived on Jul. 20, 2009 at <<http://www.linkedin.com/>>, LinkedIn Corporation, entire website, 1 page.

Office action for U.S. Appl. No. 12/464,053, mailed on Dec. 21, 2011, Inventor #1, "Data Mining for Targeted Republishing", 17 pages.

Non-Final Office Action for U.S. Appl. No. 12/464,026, mailed on Dec. 23, 2011, Victoria A. Griffith et al., "Data Mining for Targeted Republishing", 27 pages.

* cited by examiner

AUTHOR-FOCUSED TOOLS FOR SCHEDULING AN EVENT ASSOCIATED WITH AN AUTHOR OR WITH A WORK OF THE AUTHOR

BACKGROUND

Retailers, authors and publishers often share a common goal of encouraging users to purchase works that the authors have created. For instance, a book store, an author of a book and a publisher of the author all strive to successfully market and sell the book to a wide audience of consumers. Unfortunately, these actors rarely act together in unison to achieve this common goal. Instead, authors simply write the book and, once the publisher publishes the book, may market the book by conducting a book tour or the like. Retailers, meanwhile, simply receive shipments of the book from the publisher and advertise the book at the store (in the case of brick-and-mortar retailers) or online (in the case of retailers operating websites).

While these traditional relationships between retailers, authors and publishers have proven fruitful to a certain extent, deeper relationships amongst this group of actors may prove even more abundant.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
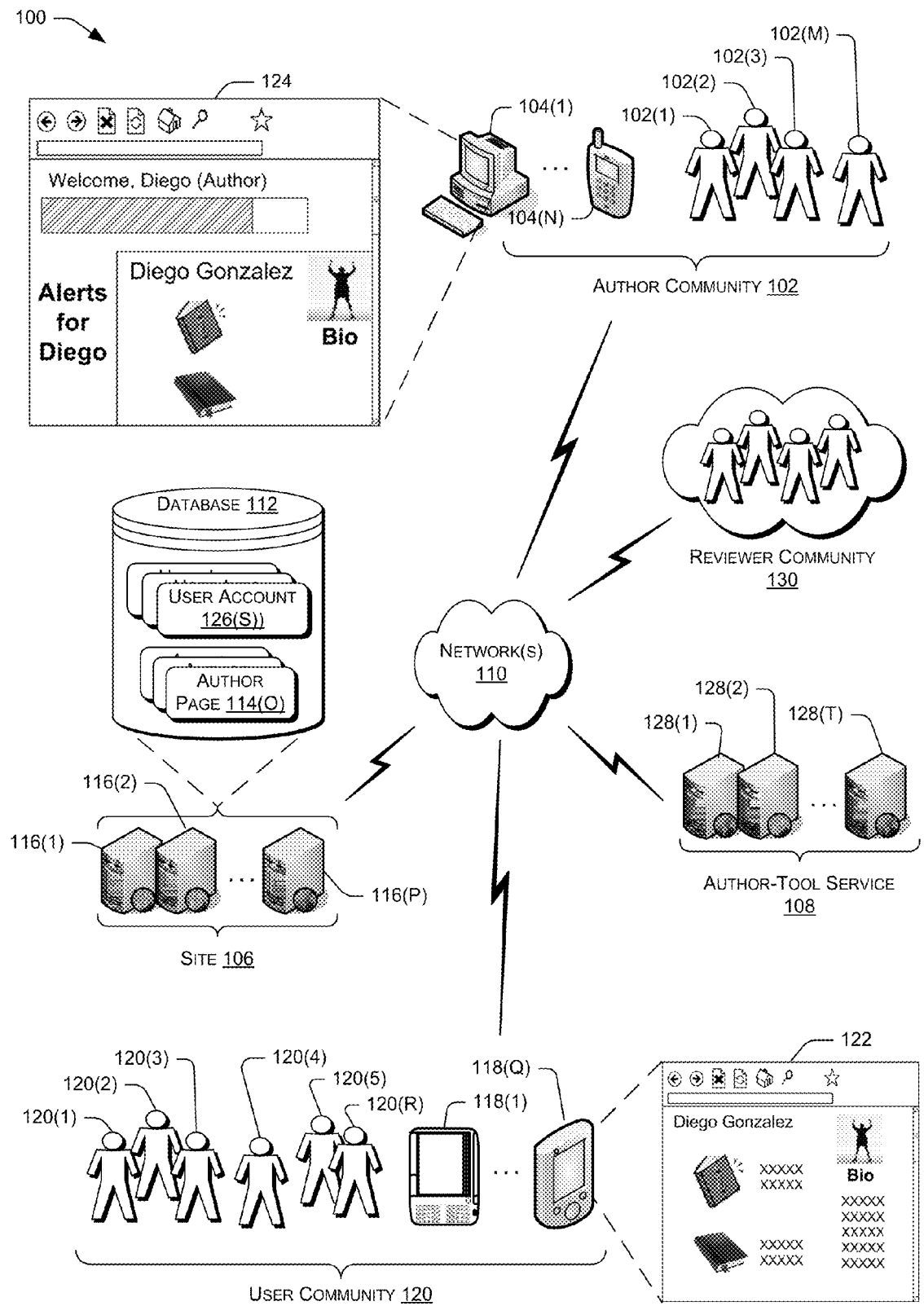
FIG. 1 illustrates an architecture in which authors interact with a site that offers works of the authors for consumption to a community of users. With help of the site and an author-tool service, each author may create content for insertion into a page that is associated with the corresponding author and that is for consumption by the community of users.

This disclosure describes, in part, a platform for better connecting authors and retailers that offer works of the authors for consumption by a community of users. This platform includes multiple tools that allow the authors or other users associated with the authors (e.g., publishers, etc.) to provide content to the community of users through the retailer or through another entity. In addition, this platform provides tools that the authors or the other users may utilize for marketing the authors' works, for tracking acquisition (e.g., sales) of their works, for connecting with other authors, or for a multitude of other purposes.

In some implementations, a retailer takes the form of a site that hosts an electronic catalog of items, some of which users of the site may purchase or otherwise consume. Some of these items for consumption (e.g., rental, lease, sale, etc.) comprise authored works. As such, this retailer site may host multiple author-specific pages that each correspond to a particular author of a work that the site may (or may not) offer for sale. In either instance, the author herself may contribute content to her author page for viewing or listening by the community of users. This author-contributed content may include a short biography about the author, a location of the author, hobbies of the author, attributes or traits of the author, or any other information that the author may wish to share. Additionally, the site may encourage the author to provide this information by, for example, messaging to the author regarding a completeness (or lack thereof) of the author's page.

In addition to utilizing the site for sharing content with users, authors may utilize the site for tracking sales of his or her works or for making intelligent marketing decisions regarding these works. In these instances, the authors may have access to content that is not available to non-author users of the site. Instead, this information may be exclusively available to the authors. For instance, if an author named "Diego Gonzalez" writes a book entitled "Grace and Me", Diego may utilize the site to track the sales of this book. This information, however, may be specific to Diego and unavailable to other authors as well as non-author users of the site.

In addition to tracking sales, Diego may use tools (that the site or a separate service provides) for making intelligent decision regarding the marketing of his book. For instance, these tools may allow Diego to schedule a book tour at one or multiple locations across a city, state, country or across the world based on geographical sales information that the site provides to Diego. Other tools, meanwhile, may assist authors, such as Diego, in other ways. For instance, the site or the associated service may provide alerts that are especially pertinent to Diego. These alerts may include, amongst other things, an indication that sales of Diego's book have surpassed a certain number, an indication that a customer has provided a review of Diego's book, an indication that a customer has commented on Diego or his book on a discussion board or any other indication that is pertinent to Diego.

The provided tools may also match Diego (and/or his book) with a group of reviewers that the site or the service has determined to be especially suitable for reviewing his book. For instance, the site may suggest (free of charge or otherwise) that Diego submit his book for review to a group of reviewer's that are considered experts in the subject matter of the book.

As this discussion highlights, the platform described above and below provides a valuable resource to authors of works, such as books, songs, videos, articles, pieces of art or other works. Some of the tools of this platform highlighted above function to strengthen a relationship between authors and some other entity, such as other authors, a community of users or a retailer. Other tools, meanwhile, provide value to the authors as they market or track the success of their works. While the discussion both above and below highlights a few example tools, it is to be appreciated that this platform may include a multitude of other tools that similarly provide value to author, consumer and retailer communities.

For discussion purposes, the following sections describe this author-based platform in the context of a site and an author-tool service that are accessible over a network. However, the concepts described herein are also applicable to a multitude of other contexts and environments.

Architectural Environment

FIG. 1 illustrates an example architecture 100 that may implement a platform for better connecting authors with entities such as retailers that offer works of the authors for consumption by a community of users. This platform may also provide tools that allow authors or users associated with the authors to track valuable information regarding their works and that allow the authors or the other users to perform valuable tasks.

As shown, architecture 100 includes an author community 102 comprising multiple authors 102(1), . . . , 102(M). Furthermore, it is noted that while FIG. 1 shows authors 102(1)-(M), it is to be appreciated that the author community 102 may include other users that are associated with the authors, such as publishers, retailers, agents, family members, fans, or the like. Each of the authors 102(1)-M has authored one or more works, such as books, songs, videos, articles, pieces of art or any other type of content. Here, each of the authors 102(1)-(M) or the users associated with the authors employs a corresponding computing device 104(1), . . . , 104(N), such as a personal computer 104(1) and a portable digital assistant (PDA) 104(N). While FIG. 1 illustrates a personal computer and PDA, the authors 102(1)-(M) may employ other computing devices, such as cellular telephones, portable media players, tablet computers, notebooks, electronic book (eBook) readers, and the like.

Whatever the specific device, the authors 102(1)-(M) employ the computing devices 104(1)-(N) to communicate with a site 106 and an author-tool service 108 via a network 110. The network 110 represents any one or combination of multiple different types of networks, such as the Internet, cable networks, wireless networks, and wired networks. In this example, the site 106 stores or has access to a database 112 that includes, amongst other things, a multitude of author pages 114(1), . . . , 114(O) that each correspond to one of the authors 102(1)-(M). Each of the authors 102(1)-(M) or the users associated with the authors may authenticate at the site 106 and, after this authentication, are allowed to contribute content to a corresponding author page of the author. It is noted that while this discussion describes author pages, each page associated with an author may indeed comprise a collection of individual pages that each provide different information about or associated with the author. It is further noted that while the following discussion describes actions taken by an author, it is to be appreciated that users associated with the author (e.g., publishers, retailers, agents, family members, fans, or the like) may instead perform each of these actions.

In FIG. 1, a group of servers 116(1), . . . , 116(P) having storage and processing capabilities hosts the site 106. The servers 116(1)-(P) may be embodied in any number of ways, including as a single server, a cluster of servers, a server farm or data center, and so forth, although other server architectures (e.g., mainframe) may also be used. Whatever its architecture, the site 106 serves author pages 114(1)-(O) to the computing devices 104(1)-(1) of the authors 102(1)-(M) as well as to computing devices 118(1), . . . , 118(Q) that each corresponding to a user 120(1), . . . , 120(R) of a community of users 120.

In some instances, each author page 114(1)-(O) includes information about a corresponding author. This information includes, for instance, a listing of works that the author has authored, a biography of the author, a location of the author, hobbies of the author or any other information regarding the author. In some instances, the site 106 provides or aggregates this information for publishing on the author page, while in other instances (and as discussed below in detail) the corresponding author provides this information via one or more tools that the author-tool service 108 provides.

In addition to serving the author pages 114(1)-(O), in some instances the site 106 comprises a retailer that offers items for consumption or acquisition to the community of users 120. For instance, the site 106 may offer works of the author community 102 for acquisition by the user community 120 (as well as the author community 102). Therefore, by additionally serving the author pages 114(1)-(O) containing engaging information about the authors 102(1)-(M), the site 106 seeks to benefit both the authors 102(1)-(O) that are offering their works for acquisition, as well as the users 102(1)-(R) (and, potentially, the authors 102(1)-(O)) that may acquire these works.

Figure 4:
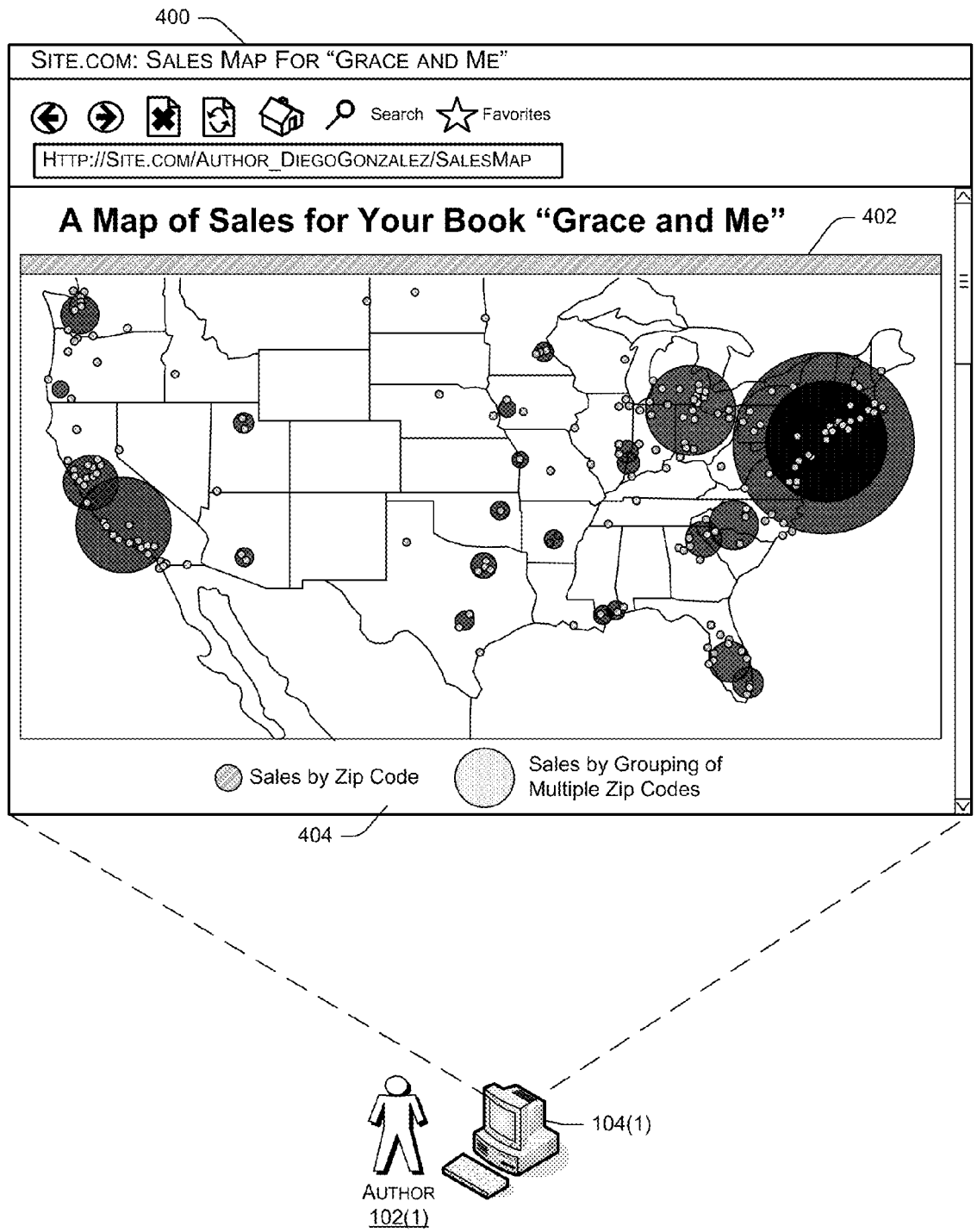
FIG. 4 illustrates a screen rendering of an example UI for display to the author, Diego, of FIG. 3. Here, this UI includes a map indicating sales by geographical region of a book that Diego has written, entitled "Grace and Me".
Figure 5:
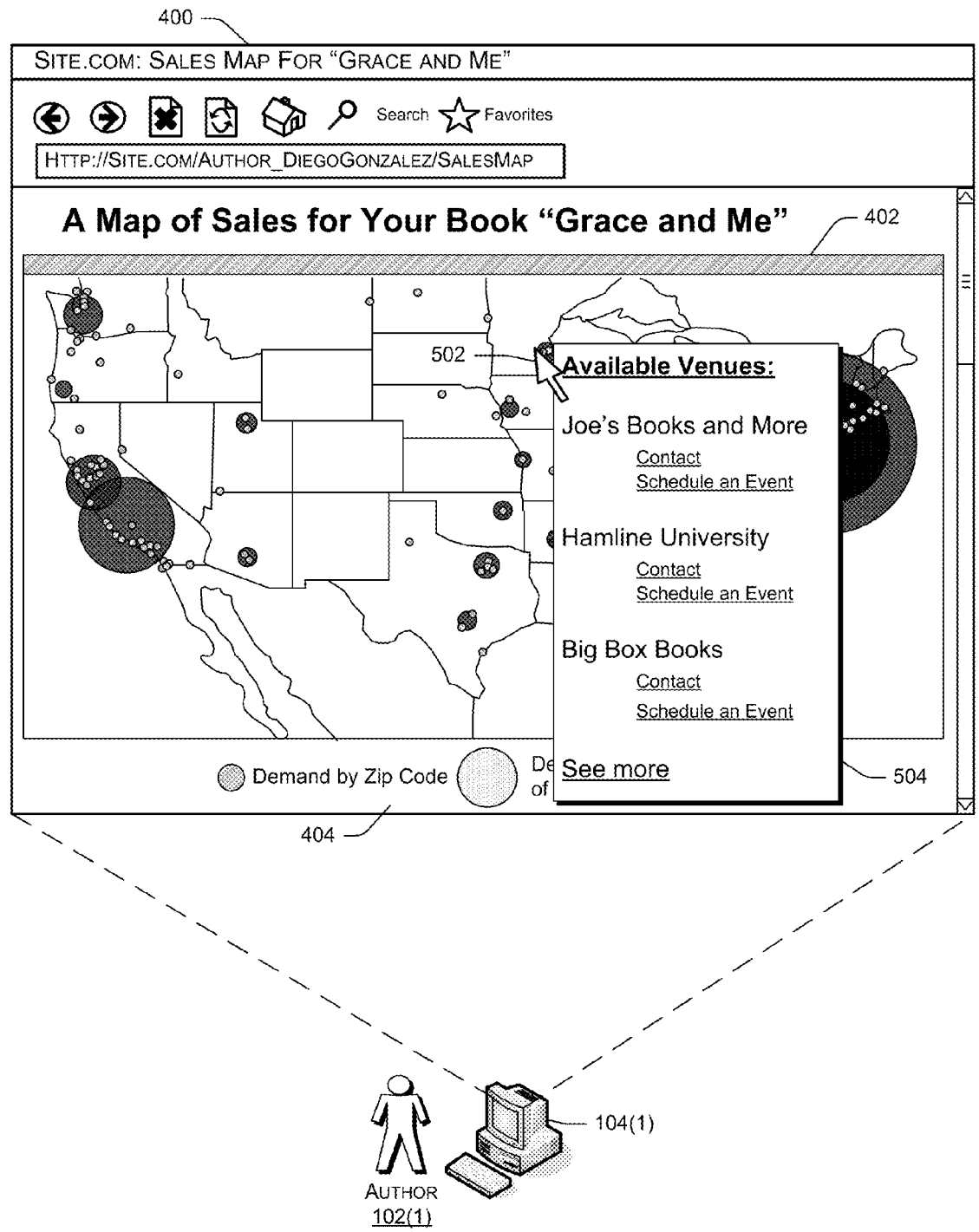
FIG. 5 illustrates the screen rendering of the example UI of FIG. 4 after Diego has selected to view available venues in a particular geographical location of the map. With use of the illustrated menu, Diego may schedule an event (e.g., a book signing) at the selected venue.
Figure 6:
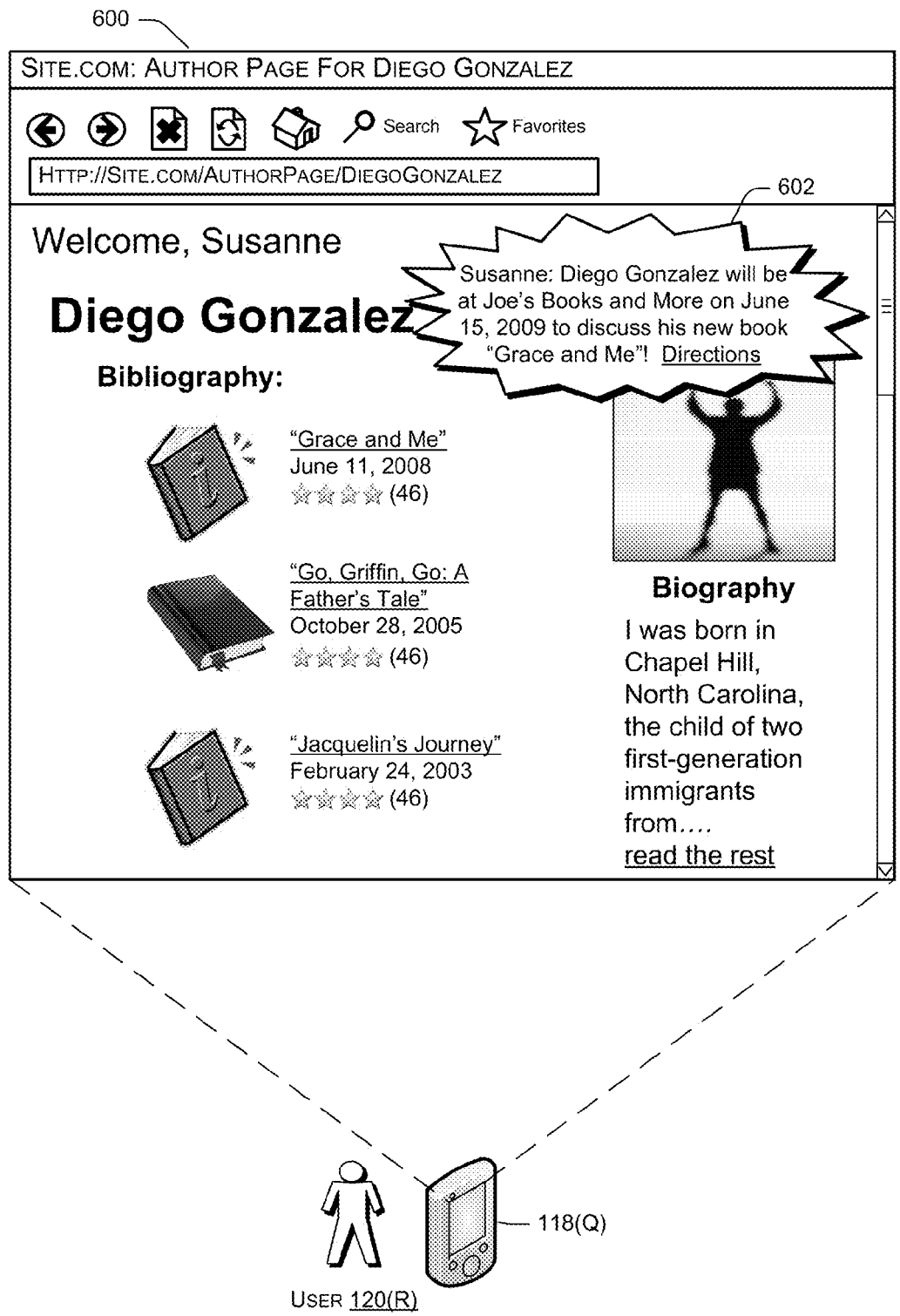
FIG. 6 illustrates a screen rendering of an example UI that the site of FIG. 1 serves to a user of the community of users of FIG. 1. This UI indicates to the user that Diego Gonzalez will attend an event at a store that is local to the user.

As shown, both the authors 102(1)-(M) and the users 120(1)-(R) of the community of users 120 render the author pages 114(1)-(O) on respective computing devices. In some instances, however, the content of an author page served to and rendered on a computing device of an author may differ from the content of the author page served to and rendered on a computing device of a non-author user (referred to herein as simply a "user"). FIG. 1 illustrates, for instance, that the site 106 serves to a user's device a user interface 122 having less content than a user interface 124 that the site 106 serves to a device of an author. FIGS. 3-5 and 7 illustrate example user interfaces that the site 106 may serve to authors of the author community 102, while FIG. 6 illustrates an example user interface that the site 106 may serve to a user of the user community 120.

To determine whether a user requesting an author page comprises an author or simply a user of community 120, the database 112 of the site 106 stores or has access to users accounts 126(1), . . . , 126(S). Each of these accounts 126(1)-(S) is associated with one of the illustrated users or authors and includes, amongst other things, an identification of the user or the author. These accounts also include security information for the purpose of authenticating each user. Therefore, when the author 102(1) signs in to his corresponding account at the site 106 and requests his author page, the site 106 serves the user interface 124 to the device of the author. When the user 120(R) signs in to her account and requests that same page, meanwhile, the site 106 serves the user interface 122 to the user 120(R).

In the illustrated example, the user interface 124 that the site 106 serves to the author's computing device 104(1) includes both information about the author that the site provides to the community of users 120, as well as more detailed content about the author or about one or more works of the author. This additional content may be specific to a particular author or may be specific to each author and the author's corresponding page.

For instance, in FIG. 1 an author 102(1) employs the illustrated computing device 104(1) to access and render the illustrated user interface 124. Here, the author 102(1) (named "Diego Gonzalez") requests and receives the author page that corresponds to himself. As such, the site 106 serves to Diego the user interface 124 that includes information specific to Diego or specific to a work that Diego has authored or is in the process of authoring.

In addition, the user interface 124 may include content that allows Diego to modify the corresponding author page. For instance, Diego could choose to alter his biography, post a blog entry on his page or provide any other sort of content. The user interface 122 that site 106 serves to the user 120(R), meanwhile, simply includes the information about the author 102(1) ("Diego Gonzalez"). This user interface 122, however, does not include the more detailed information of the user interface 124, nor does it include tools to alter or provide content for insertion into the rendered authored page.

As discussed above, the author-tool service 108 provides one or more tools to the author community 102 to allow these authors the ability to modify or provide content for their associated author pages. Additionally or alternatively, the author-tool service 108 provides tools for these authors to receive rich information regarding works that they have created, such as books, songs, videos or the like. In the illustrated example, the author-tool service 108 comprises servers 128 (1), . . . , 128(T) arranged as a server farm, data center, web service or other configuration. Furthermore, while the illustrated example depicts the author-tool service 108 as distinct from the site 106, other implementations may unify some or all of the functionality that these entities provide.

The author-tool service 108 may provide a varying number of tools. For instance, this service 108 may include tools that allow authors, such as the author 102(1), to modify his author page. In this regard, the service 108 messages to an author a completeness of the author's page (e.g., "You're Page is 60% Complete"). That is, the service 108 messages how much content the author has provided relative to the amount of content needed for a page to be deemed "complete".

These tools may also provide rich information regarding works of a corresponding author, such as sales data of a particular work, a sales rank of a particular work or any other information that may be of importance to the author. The service 108 may allow the author to view this data in maps, charts, via alerts from the service 108 or from the site 106 or in any other suitable manner.

Additionally, the service 108 may provide a tool that enables recommendation of a particular group of users to function as reviewers for a work of the author. As FIG. 1 illustrates, the architecture 100 further includes a reviewer community 130. The reviewer community comprises a group of human users that review content that the site 106 provides or otherwise. Furthermore, each reviewer of the group of reviewers may have an expertise in one or more areas. As such, the author-tool service 108 may determine a subject matter of a work of the author 102(1) and may match this subject matter with a group of reviewers of the reviewer community 130. The service 108 or the site 106 may then recommend (free of charge or otherwise) this group of reviewers to the author 102(1).

As can be appreciated, the architecture 100 provides a platform where an author community 102 may better connect with a site 106 (e.g., a retailer) and with a user community 120 of the site 106. Specifically, an author-tool service 108 enables the author community 102 to provide content for corresponding author pages, which the user community 120 then views or otherwise consumes. Furthermore, the author-tool service 108 in combination with the site 106 provides rich information to the author community 102 that may help these authors market their works, track acquisition (e.g., sales) of their works, or may otherwise assist the authors. Having described an example architecture that may implement these tools, FIG. 2 and an accompanying discussion illustrate and describe these tools in greater detail.

Example System

Figure 2:
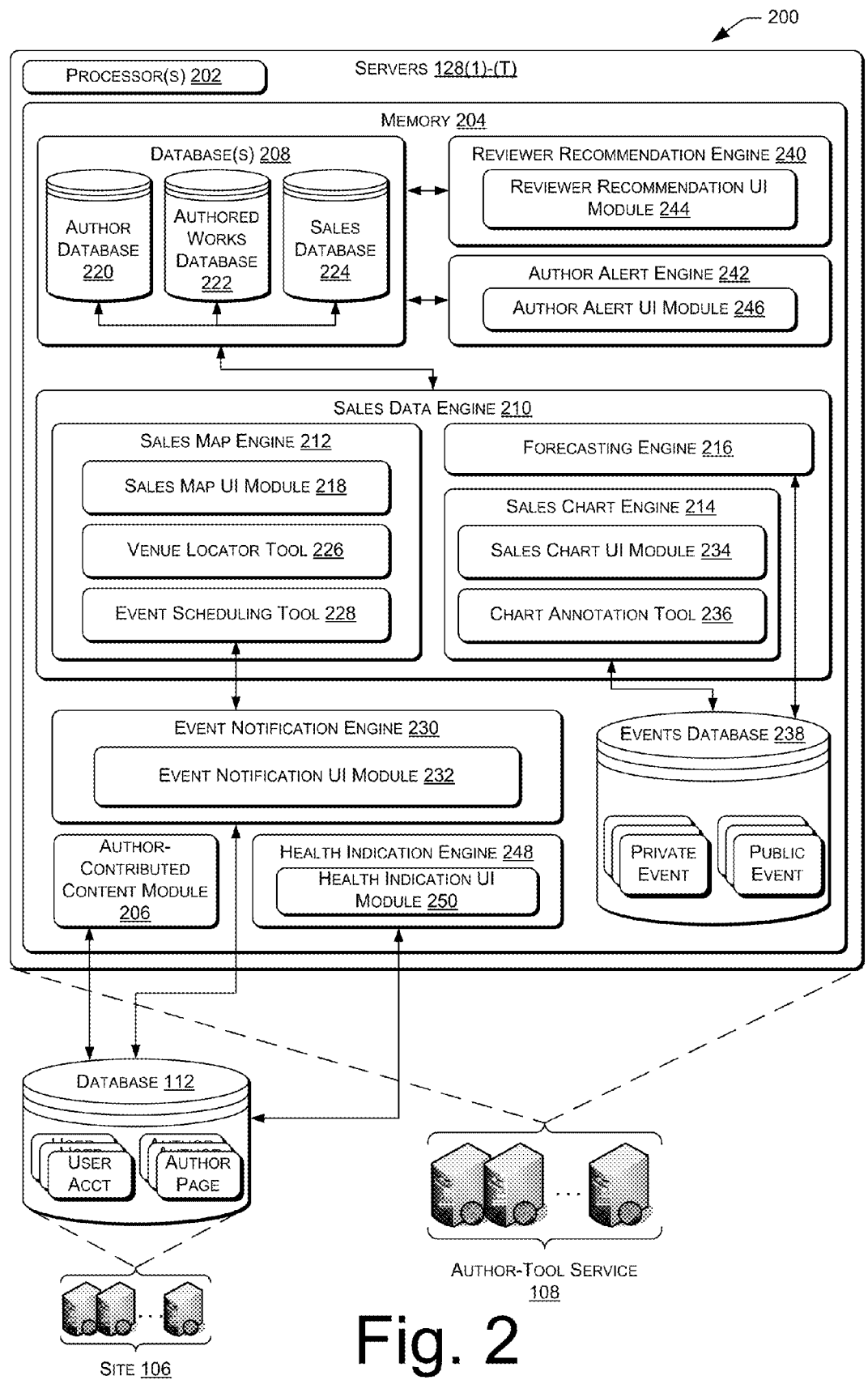
FIG. 2 is a block diagram illustrating selected modules in a computing system that implements tools for creating a stronger connection between the authors, the site and the community of users of FIG. 1.

FIG. 2 shows selected modules in a representative computer system 200 that may be used to implement the tools described above. The system 200 includes the servers 128(1)-(T) of the author-tool service 108 as well as the servers 116(1)-(P) of the site 106. The servers 128(1)-(T) collectively provide processing capabilities 202 and memory 204. The memory 204 may include volatile and nonvolatile memory, removable and non-removable media implemented in any type or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As FIG. 2 illustrates, the memory 204 stores a collection of components including an author-contributed content module 206 in a lower-left-hand corner of FIG. 2. Author-contributed content module 206 enables an author, such as the author 102(1), to contribute content to a corresponding author page 114(1) of the author. Additionally, the module 206 may enable the author 102(1) to provide content via other channels, such as through the site 106 and to user accounts of particular users of the site. As illustrated, module 206 communicates (e.g., via network 110) with the database 112 of the site 106 in order to provide this content from the author 102(1).

As discussed above, this content may include any sort of information about the author, about a work of the author, or any other sort of information. For instance, the author 102(1) may provide biographical information, a location of the author, authors that the author 102(1) recommends or any other content.

Figure 3:
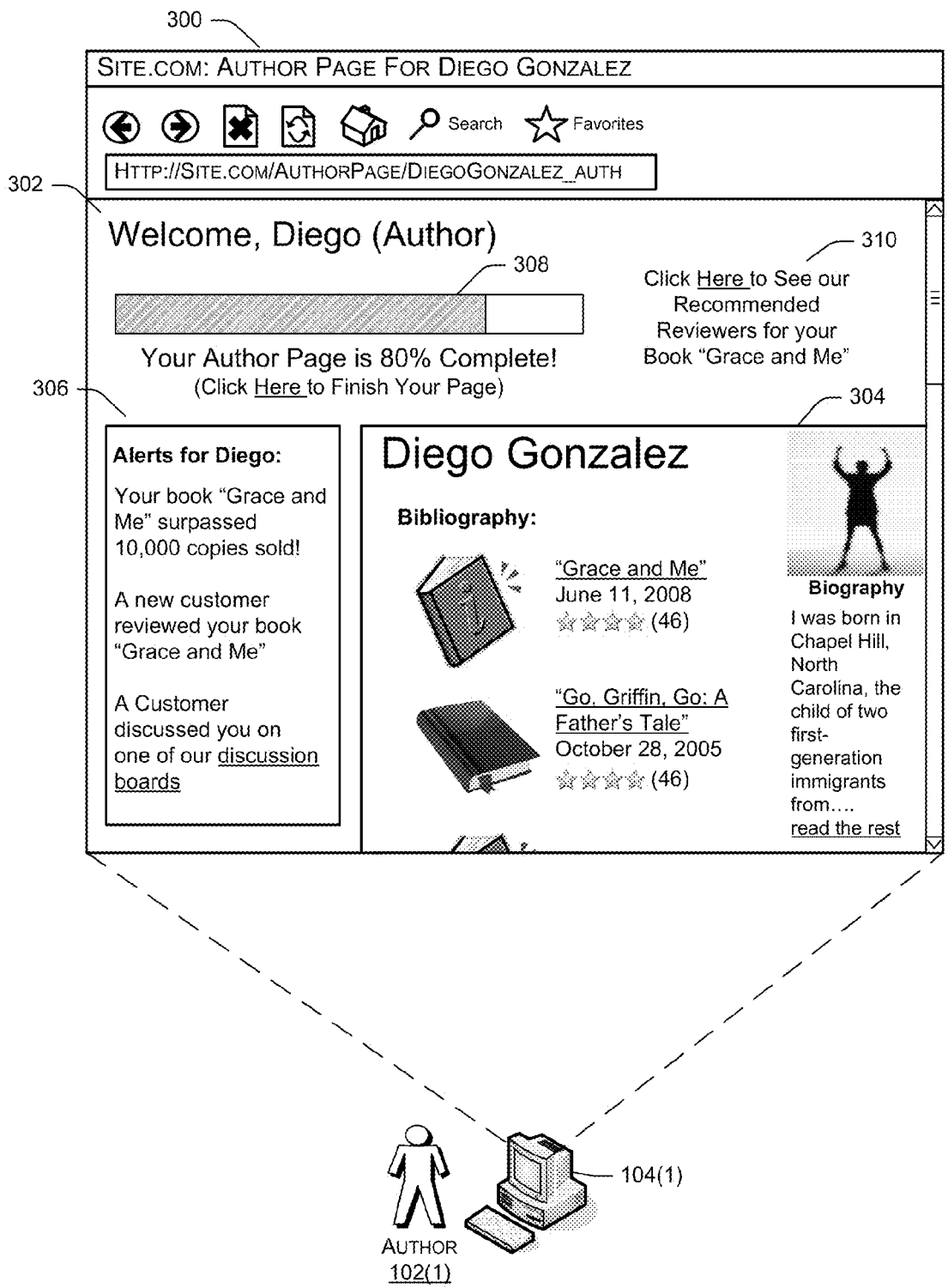
FIG. 3 illustrates a screen rendering of an example user interface (UI) that is associated with an author named "Diego Gonzalez". Because Diego himself views this UI in the example, the UI includes content that is available to the community of users from FIG. 1 as well as content that is for display only to Diego.

In some instances, the module 206 enables the author 102 (1) to provide content about a work that that the author has yet to complete. For instance, the module 206 may enable the author to create an item detail page associated with this work-in-progress. FIG. 3 and an accompanying discussion depict and describe an example UI that includes content that the author-contributed content module 206 serves based on input from the author 102(1).

Next, the memory 204 stores a collection of one or more databases 208 in communication with a sales data engine 210. The sales data engine 210 functions to receive information such as sales data from the databases 208 and provide rich information to the authors based on this information. In some instances, this information relates to sales of works created by the corresponding author.

More specifically, the sales data engine 210 includes a sales map engine 212, a sales chart engine 214 and a forecasting engine 216. The sales map engine 212 includes a sales map user interface (UI) module 218 that receives information from the databases 208 and serves a UI that illustrates this sales data on a geographical map. That is, the engine 212 serves a UI that shows a breakdown of sales for a particular work (or collection of works) by geographic regions. FIG. 4 and an accompanying discussion depict and describe an example UI that the engine 212 may serve.

In order to provide this user interface, the databases 208 include an author database 220, an authored-works database 222 and a sales database 224. The author database 220 maintains a listing of authors having corresponding author pages 114(1)-(O) hosted on the site 106. The authored-works database 222, meanwhile, maintains a listing of the works (e.g., books, songs, videos, etc.) that these authors have created. Finally, the sales database 224 maintains sales data for these authors, both on a per-author basis and a per-work basis.

With these components in mind, envision that the sales map engine 212 receives a request via network 110 from a particular author 102(1) to view a geographical map that illustrates sales for a particular work. In response to receiving this request, the engine 212 requests the sales data for the corresponding work (by the corresponding author) from the databases 208. When the engine 212 receives this information, the UI module 218 serves the geographical map illustrating the sales to the requesting author 102(1).

As FIG. 2 illustrates, the sales map engine 212 additionally includes a venue locator tool 226 and an event scheduling tool 228 that operate in conjunction with the UI module 218. In response to receiving a request from an author, venue locator tool 226 functions to locate venues in a specified geographic location that are available to host an event. For instance, envision that upon receiving the sales from the UI module 218 in the above example, the author sees that a particular book of his has sold well in Minneapolis, Minn. Accordingly, the author 102(1) decides to have a book signing at some venue at or near Minneapolis, but the author 102(1) is unsure as to what venues are available.

Here, the author 102(1) may send a request to the author-tool service 108 for a listing of venues that are available to host book signings in Minneapolis, Minn. Upon receiving this request, the venue locator tool 226 may determine (or may previously have determined) a listing of venues in this region. These venues may include, for instance, book stores, universities, schools, museums or any other type of venue.

In instances where these venues are predetermined, operators of the author-tool service 108 may have previously manually or automatically compiled geographical lists of available venues. In some instances, a representative of a venue registers with the site 106 and/or the author-tool service 108 in order to make the venue available to host one or more events (e.g., book tours, book signings, etc.). In response to an author or other user associated with the author selecting a venue from a sales map, the selected venue may schedule the event with the site, the author-tool service and/or the author or representative of the author.

Furthermore, these listing of available venues may vary based on a context or subject matter of the event. A museum may be listed as available for a book signing regarding a non-fiction book, for example, while this museum may not be listed as available for a book signing regarding a fiction book. As such, in response to receiving a request for a particular event, the venue locator tool 226 may take into account the context of the event before returning an appropriate list of available venues. Additionally or alternatively, the venue itself may select which type of events (e.g., non-fiction book signings) the venue would like to host and, by doing so, may not make itself available for other types of events (e.g., fiction book signings). FIG. 5 and an accompanying discussion depict and describe an example UI that the venue locator tool 226 may serve in response to receiving a request for available venues.

Event scheduling tool 228, meanwhile, functions to schedule events at a specified venue at the request of the user. Returning to the example, after receiving a listing of available venues in Minneapolis from the venue locator tool 226, the author 102(1) may select a venue at which to host the event. In response, the event-scheduling tool 228 may automatically schedule the event for the author 102(1) or may instead provide information (e.g., phone number, address, email address, etc.) to the author 102(1) to enable the author 102(1) to himself contact the venue for scheduling the event.

Outside of the sales data engine 210, meanwhile, the memory 204 stores an event notification engine 230 that communicates with the event scheduling tool 228 as well as with the site 106. As illustrated, this engine 230 includes an event notification UI module 232. The event notification engine 230 functions to determine users of the community of users 120 that reside within a location that is proximate to an event that an author schedules.

For instance, if the author 102(1) schedules an event with use of the event scheduling tool 228 (or otherwise), the tool 228 may inform the event notification engine 230 of the scheduled event. Specifically, the tool 228 may inform the engine 230 of the location of the event, as well as the content and context of the event. With this information, the event notification engine 230 may contact the site 106 to determine which users of the community of users 120 are within a predefined distance from this event. From this group, the engine 230 may also determine which users would likely be interested in the event.

In the current example, for instance, the engine 230 may determine which users are within fifty miles of Minneapolis, Minn. The engine 230 may then determine which of these users are fans of the author 102(1), fans of the particular work (e.g., users who have purchase that work or a similar work), fans of the genre of the work, or the like. With this information, the event notification UI module 232 may then notify these users about the upcoming event via any suitable channel. For instance, the module 232 may send an email, a text message, or any other communication to these users. This information may additionally or alternatively appear on an author page 114(1)-(O) for those users that meet the requirements discussed above, as illustrated by FIG. 6. Finally, while FIG. 2 describes that engine 230 may serve a user interface, it is to be appreciated that other implementations may notify users orally or in any other suitable manner.

Returning to the sales data engine 210, the sales chart engine 214 functions to receive sales data from the databases 208 and provide an annotatable sales chart to a requesting author, such as the author 102(1). For instance, the author 102(1) may request to receive a sales chart indicating sales over time for a particular work of the author. The author may then annotate the chart with both past and future events as described in detail below.

Figure 7:
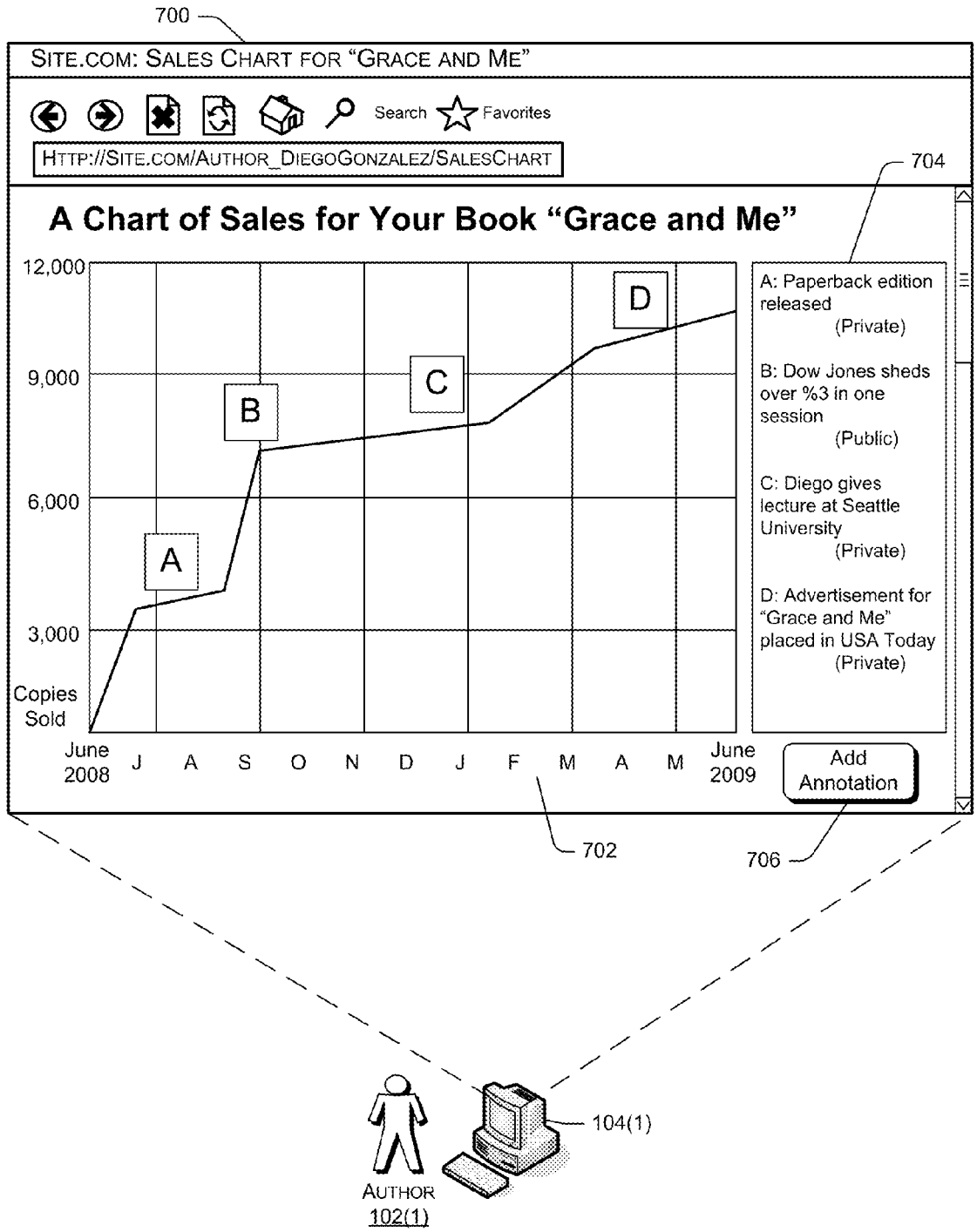
FIG. 7 illustrates a screen rendering of an example UI for display to the author, Diego. This UI includes a sales chart depicting sales of Diego's book ("Grace and Me") over time and with reference to several events that have occurred during the illustrated time.

As illustrated, the engine 214 includes a sales chart UI module 234 and a chart annotation tool 236. In response to receiving a request for a sales chart associated with a particular work (or works), the UI module 234 creates a sales chart UI based on the information from the databases 208 and serves this UI to the device 104(1) of the requesting author 102(1). FIG. 7 and an accompanying discussion depict and describe an example UI that the UI module 234 may serve in response to receiving this request.

Sales chart annotation tool 236, meanwhile, enables the author to annotate the chart with past or future events. For instance, if the author gave a lecture regarding the particular work on a particular day, the author 102(1) may add this past event onto the sales chart at the particular day on the chart. As such, the chart would reflect the occurrence of this event occurred on that particular day. Additionally, the author 102 (1) may choose to provide details about the event, which may also be displayed over or proximate to the chart. By annotating the sales chart with events, the author 102(1) may be able to better see the effects of the events on the sales of the book (e.g., good, bad or indifferent effects).

When the author 102(1) requests to annotate the chart with an event, the author-tool service 108 stores the event in an events database 238 that is communication with sales chart engine 214. By staying in communication with the database 238, the UI module 234 is able to serve sales charts with their corresponding events.

When an author such as the author 102(1) annotates the chart with an event that is particular to his or her chart, this event may be deemed a "private event". Private events typically only affect the particular sales chart or a small group of sales charts. For instance, the author's event comprising his lecture about the particular work likely only affects the sales chart for that work as well as for the sales charts for other works of the author 102(1).

In addition to storing private events, however, the database 238 may also store public events. In some instances, public events are events that may affect a large number of sales charts. For instance, if the stock market declines a large amount in a single session, this event may understandably affect the sales of a great majority of authored works. As such, if the author 102(1) were to annotate his sales chart with this event and specify this event as a public event, then other authors' sales charts will also reflect this annotated event. In addition to authors providing public events, the site 106, the author-tool service 108 or other entities may additionally or alternatively annotate charts with public events or may store public events in database 238 for rendering on authors' sales charts.

Finally, the sales data engine 210 includes the forecasting engine 216 that is similarly in communication with the events database 238. The forecasting engine 216 functions to analyze the events stored in the events database 238 as well as the information from the databases 208. With this information, the forecasting engine 216 predicts a future demand for a particular work or works. In some instances, the forecasting engine 216 particularly relies on future events that authors 102(1)-(M) store within the events database 238.

For instance, if an author annotates her chart to indicate that she will appear on "Larry King Live" on CNN® in two months, then the forecasting engine 216 may predict an increase in demand for the author's works in approximately two months. In some instances, the author-tool service 108 provides this information to retailers, such as site 106, to enable the retailers to order more copies of the works in anticipation of the increased demand.

The memory 204 further stores a reviewer recommendation engine 240 and an author alert engine 242. The reviewer recommendation engine 240 functions to recommend a particular group of reviewers to review a particular work of an author. For a particular work of a particular author, for instance, the engine 240 may determine a genre of the book (with reference to the databases 208) and may match this genre with a particular set of reviewers of the reviewer community 130. The chosen reviewers may be considered subject matter experts in the determined genre. In some instances, the engine 240 recommends that the author have this particular group of reviewers review the work before release of the work to the public.

A more detailed discussion of a methodology for matching reviewers with authored works is provided in the co-pending application Ser. No. 11/540,931, which is titled "System and Method for Generating Comments on a Product" and was filed on Sep. 29, 2006. This application is hereby incorporated by reference in its entirety.

To recommend a group of reviewers to an author, the engine 240 may include a reviewer recommendation UI module 244. This module 244 may create and serve a UI that relays the recommendation to the author. Of course, in other implementations the reviewer recommendation engine 240 may alternatively relay these recommendations orally or in any other suitable manner.

Author alert engine 242, meanwhile, functions to alert authors of events that may be of interest to the authors. These events may relate to information that is specific to an author (e.g., sales data of a work of the author) or information that is not specific to the author (e.g., notification of an impending film festival). To alert authors of the former events, the author alert engine 242 remains in communication with the databases 208 and, potentially, with the site 106.

For instance, if sales of a particular work of the author 102(1) passes a predefined threshold, then the engine 242 may alert the author 102(1) of this event. Similarly, if a user of the community of users 120 reviews a work of the author 102(1) or comments about the work or the author on a discussion board of the site 106, then the engine 242 may notify the author regarding the reviewing event. In some instances, the authors may choose which types of events they wish to be alerted about (e.g., reaching a predefined number of sales of a particular work) and may configure each of the parameters for these events (e.g., 10,000 copies).

As illustrated, the author alert engine 242 includes an author alert UI module 246 that may serve a UI that includes these alerts. This UI (as well as some of all of the UI discussed herein) may form a portion of an author page associated with the author 102(1), as FIG. 3 illustrates. Again, however, other implementations may alert the author 102(1) to these events orally or in any other suitable manner.

Finally, the memory 204 is shown to include a health indication engine 248 that includes a health indication UI module 250. The health indication engine 248 functions to encourage authors 102(1)-(M) to complete their corresponding author pages 114(1)-(O). That is, the engine 248 encourages the authors 102(1)-(M) to provide content for these pages, such as biographical information or any of the information discussed above. In some instances, the health indication engine 248 considers an author page "complete" when the author has provided information for each available field in the in page.

In order to so encourage the authors, the UI module 250 may provide a message to the authors on their corresponding author pages 114(1)-(O), as FIG. 3 illustrates. This message may indicate, for example, that the author 102(1) has completed a particular percentage (e.g., 80%) of the author page. The message may also include a link that, when selected, allows the author to provide further content. As opposed to percentages, the UI module 250 may alternatively provide badges for display on author pages that are complete or may otherwise encourage the authors to complete their author pages. Furthermore, while FIG. 2 illustrates the UI module 250, other implementations may provide this message and encouragement to the authors 102(1)-(M) orally or in any other suitable manner.

Example User Interfaces

FIGS. 3-7 show a series of screen renderings of example user interfaces that the site 106 and the author-tool service 108 of FIGS. 1 and 2 may serve and enable. In this example series, the screen renderings are illustrated as web pages rendered within a browser. However, this is merely one possible implementation, and other technologies may be employed to facilitate the functionality described herein.

FIG. 3 illustrates an example user interface 300 that the site 106 and the author-tool service may serve to the computing device 104(1) of the illustrated author 102(1). Here, the UI 300 comprises an author page corresponding to the author 102(1). Because the site 106 has authenticated this requesting user as the author 102(1) associated with the page, the UI 300 includes content 304 that is publicly accessible by the community of users 120 as well as content that is not. As illustrated, the publicly-accessible content 304 includes a bibliography of books written by the author 102(1) (e.g., "Grace and Me", "Go, Griffin, Go: A Father's Tale", etc.) as well as a biography of the author 102(1).

In addition to this information, the UI 300 includes a welcome 302 to the author 102(1) ("Diego Gonzalez") that indicates that the user viewing this UI 300 is indeed the author associated with the page. In addition, the UI 300 includes multiple alerts 306 that the previously-described author alert engine 242 may serve to the author 102(1). As illustrated, these example alerts 306 notify Diego that his book "Grace and Me" has surpassed 10,000 copies sold. These alerts 306 also indicate that a new user of the user community 120 has reviewed this book, while another user has discussed Diego on a discussion board of the site 106.

FIG. 3 also illustrates that the UI 300 includes an indication 308 that messages to the author 102(1) a completeness of his associated author page. As discussed above, the health-indication engine 248 (and, more particularly, the health indication UI module 250) may serve this indication 308 for inclusion in the UI 300. Here, the indication 308 indicates that the author 102(1) has completed 80% of his author page. This indication also includes a link that, when selected, enables the user to complete his page by providing the missing content. Furthermore, while the indication 308 here comprises a percentage completion, it is to be appreciated that other implementations may provide this message in any number of other ways.

Finally, the UI 300 includes a recommendation 310 that suggests a particular group of reviewers to review the author's book entitled "Grace and Me". As discussed above, the reviewer recommendation engine 240 may have provided this recommendation for the author. Furthermore, upon selecting the highlighted link, the site 106 and the author-tool service 108 may provide information to the author 102(1) regarding how to initiate review of this work by the recommended reviewers. The link may additionally or alternatively display to the author 102(1) information (e.g., names, background information, etc.) of the recommended reviewers.

FIG. 4, meanwhile, illustrates another example user interface 400 that the site 106 and the author-tool service 108 may serve to the device 104(1) of the author 102(1). Here, this UI 400 includes a sales map 402 that indicates a geographical distribution of sales of Diego's book "Grace and Me". More specifically, the map 402 depicts sales of this book by regions within the United States. Further, while UI 400 illustrates a map at the country level, other implementations may include sales maps at a global, continental, state, city or borough level. Additionally, while the UI 400 here illustrates sales, other implementations may illustrate other sorts of acquisitions, such as rentals, leases, downloads, etc.

As illustrated, the UI 400 also includes a key 404 for use by the author 102(1) in interpreting the map 402. Here, the key 404 indicates that some of the circles illustrated in the map 402 represent sales of the book by zip codes, while some larger circles represent sales of the book by groupings of zip codes.

With use of the map 402, the author 102(1) may better understand the success by region of the author's book. With this information, the author 102(1) may make educated decisions regarding where to schedule events (e.g., stops along a book tour, book signings, etc.). In some instances, the author 102(1) may decide to focus on areas, such as the northeastern portion of the U.S., where the author or the work is popular. In other instances, meanwhile, the author 102(1) may instead choose to focus on areas (e.g., the inland northwest portion of the U.S.) where the author 102(1) or the work is not as popular.

As discussed with regards to the sales map engine 212 above, some implementations may facilitate scheduling of events by the author 102(1) with use the map 402. For instance, the sales map engine 212 may enable a user to select a location of the map 402 and request to view available venues in that location. Additionally, the sales map engine 212 may enable the author 102(1) to automatically schedule an event at one of these available venues.

FIG. 5, for instance, illustrates the map 402 after the author 102(1) has selected (e.g., via a cursor 502) to view available venues at or near Minneapolis, Minn. In response, the sales map engine 212 serves a menu 504 for rendering on the computing device 104(1) of the author 102(1). As illustrated, this menu 504 illustrates three available venues to host an event associated with the book "Grace and Me". Here, the venues include "Joe's Books and More" (a local book store), Hamline University (a local university) and "Big Box Books" (a chain book store). The menu 504 also includes a link (entitled "See more") that, when selected, serves additional available venues for rending on the menu 504 or otherwise.

In addition to listing the available venues, the menu 504 also includes links (entitled "Contact") that, when selected, provides the author with contact information for the purpose of scheduling an event at the selected location. The menu 504 also includes links (entitled "Schedule an Event") that, when selected either automatically schedules the event or initiates a pipeline between the author and the selected venue that results in a scheduling of the event. In either instance, the map 402 and the menu 504 facilitates the scheduling of events associated with works of the author 102(1).

FIG. 6, meanwhile, illustrates an example user interface 600 that the site 106 and the author-tool service 108 may serve to a computing device 118(Q) of a user 120(R) after the author 102(1) schedules an event at Joe's Books and More in Minneapolis, Minn. (via map 402 or otherwise). As illustrated, the user interface 600 comprises an author page associated with author 102(1) "Diego Gonzalez". As such the UI 600 includes content associated with Diego, such as his bibliography and his biography. As opposed to the UI 300 of FIG. 3, however, UI 600 refrains from including the author-tailored controls, notifications and recommendations.

Instead, the UI includes an indication 602 that "Diego Gonzalez" will be at Joe's Books and More on Jun. 15, 2009 to discuss his new book "'Grace and Me'." This indication 602 also includes a link (entitled "Directions") that, when selected, provides directions to "Joe's Books and More".

In some instances, site 106 or author-service tool 108 may serve the notification 602 as a standard portion of the author page regardless of an identity of the requesting user. In other instances, however, the site 106 or the author-tool service 108 may serve the indication to users of the community of users 120 that are located proximate to (e.g., within one block of, in the same city as, in the same state as, etc.) the scheduled event. Additionally, the site 106 or the author-tool service 108 may further limit this group to those that are associated with or thought to be interested in the actual book or the genre of the book "Grace and Me", the author 102(1) Diego Gonzalez or the like.

FIG. 7 illustrates an example user interface 700 that the site 106 and the author-service tool 108 may serve to the computing device 104(1) of the author 102(1) after Diego requests to view a sales chart 702 associated with his book "Grace and Me". As discussed above, the sales chart engine 214 may serve the illustrated sales chart 702 that represents a number of copies of the book sold over time.

In addition to tracking the total number of copies sold with time, the sales chart further includes one or more annotations (labeled A-D), each of which are associated with a public or a private event. The UI 700 also includes a description 704 for each of the annotated events A-D. First, the description 704 of event A indicates that around the end of July 2008, the publisher of the book released the paperback edition of the book. Further, the sales chart 702 illustrates that sales increased around the time of this private event.

Next, the description 704 of event B indicates that sometime in September of 2008 the Dow Jones Index shed more than 3% of its value in a single session. Here, the sales chart 702 illustrates that sales flattened around the time of the occurrence of this public event. Event C, meanwhile, corresponds to when the author 102(1) gave a lecture at Seattle University. Again, sales appear to increase in response to this event. Finally, event D indicates that around the end of April 2008, the author 102(1) placed an advertisement for the book in the USA Today® newspaper. Unfortunately, it appears from the sales chart 702 that sales did not increase at a rate previously seen from events A and C.

In addition, the UI 700 includes an icon (entitled "Add Annotation") that, when selected, enables the author 102(1) to add one or more public or private events to the sales chart 702 and, potentially, to one or more other sales charts. Furthermore, these entered events may occur in the past or, in some instances, may be schedule to occur in the future.

Figure 8:
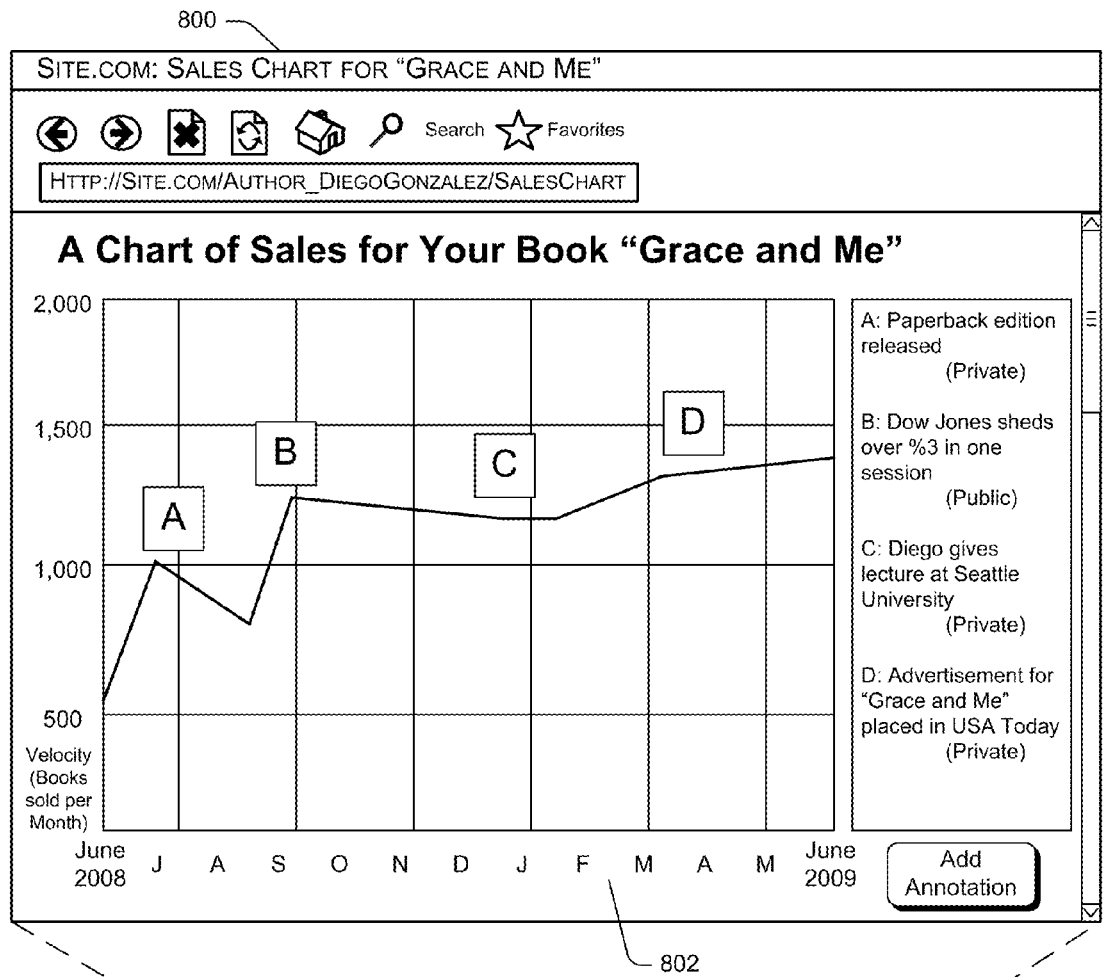
FIG. 8 illustrates a screen rendering of another example UI that includes a sales chart. Here, the sales chart indicates a sales velocity of Diego's Book "Grace and Me".
Figure 8:
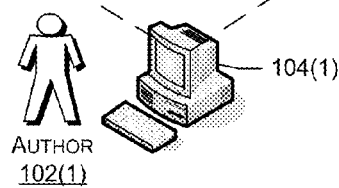

FIG. 8, meanwhile, illustrates yet another example user interface 800 that the site 106 and the author-service tool 108 may serve to the computing device 104(1) of the author 102 (1) after Diego requests to view a sales chart 802 associated with his book "Grace and Me". Here, however, the sales chart 802 represents a sales velocity of the book over time. That is, the sales chart 802 indicates a velocity at which consumers have purchased the book at different locations in time. Again, the sales chart 802 includes multiple events that have occurred or are scheduled to occur at particular locations in time illustrated on the chart. As such, the author may evaluate how different events affect a sales velocity (and, hence, sales) of the book.

Operation

Figure 9:
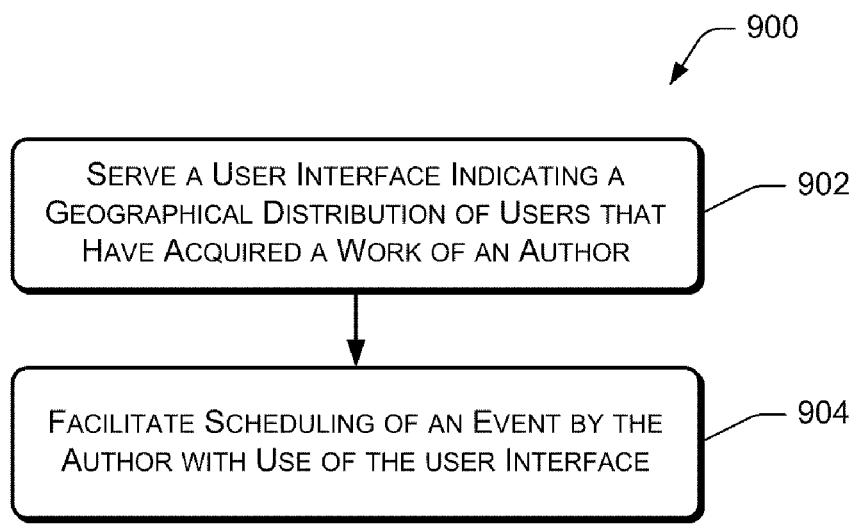
FIGS. 9-13 are flow diagrams for processes for implementing techniques described herein.

FIG. 9 shows a process 900 of an author scheduling an event, such as a book signing, with use of a user interface that includes a sales map, such as the map of FIGS. 4-5. The process 900 (as well as processes 1000, 1100, 1200 and 1300 in FIGS. 10, 11, 12 and 13, respectively) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 900 includes operation 902, which represents the serving of a user interface for display on a computing device of an author of a work or a user associated with the author. This user interface may indicate a geographical distribution of users that have acquired the work of the author. For instance, this geographical distribution may comprise the map 402 of FIGS. 4 and 5. Next, operation 904 represents facilitating scheduling of an event by the author or by the user associated with the author with use of the user interface indicating the geographical distribution of the users. For instance, the author of the work may schedule a book signing at a particular venue in Minneapolis, Minn. with use of the menu 504 of FIG. 5.

Figure 10:
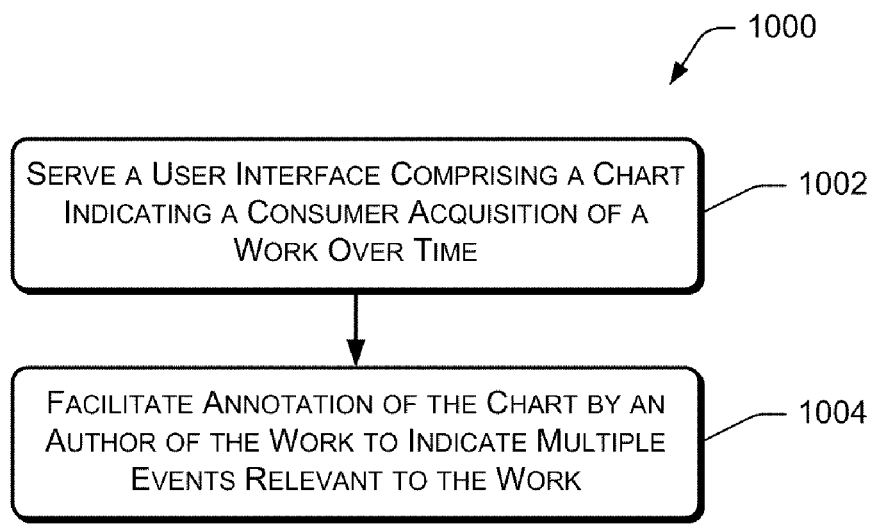

FIG. 10 illustrates process 1000, which includes serving a user interface for display on, for example, a computing device of an author of a work or a user associated with the author at operation 1002. This user interface may comprise a chart indicating consumer acquisition of the work over time. For instance, this chart may comprise the sales chart 702 of FIG. 7 or the sales chart 802 of FIG. 8. Next, an operation 1004 facilitates annotation of the chart by, for example, the author of the work or by the user associated with the author to indicate multiple events that are relevant to the work and have occurred or are scheduled to occur at a particular time on the chart. For instance, the author of the work may annotate the sales chart 702 from FIG. 7 with events A-D also illustrated in FIG. 7.

Figure 11:
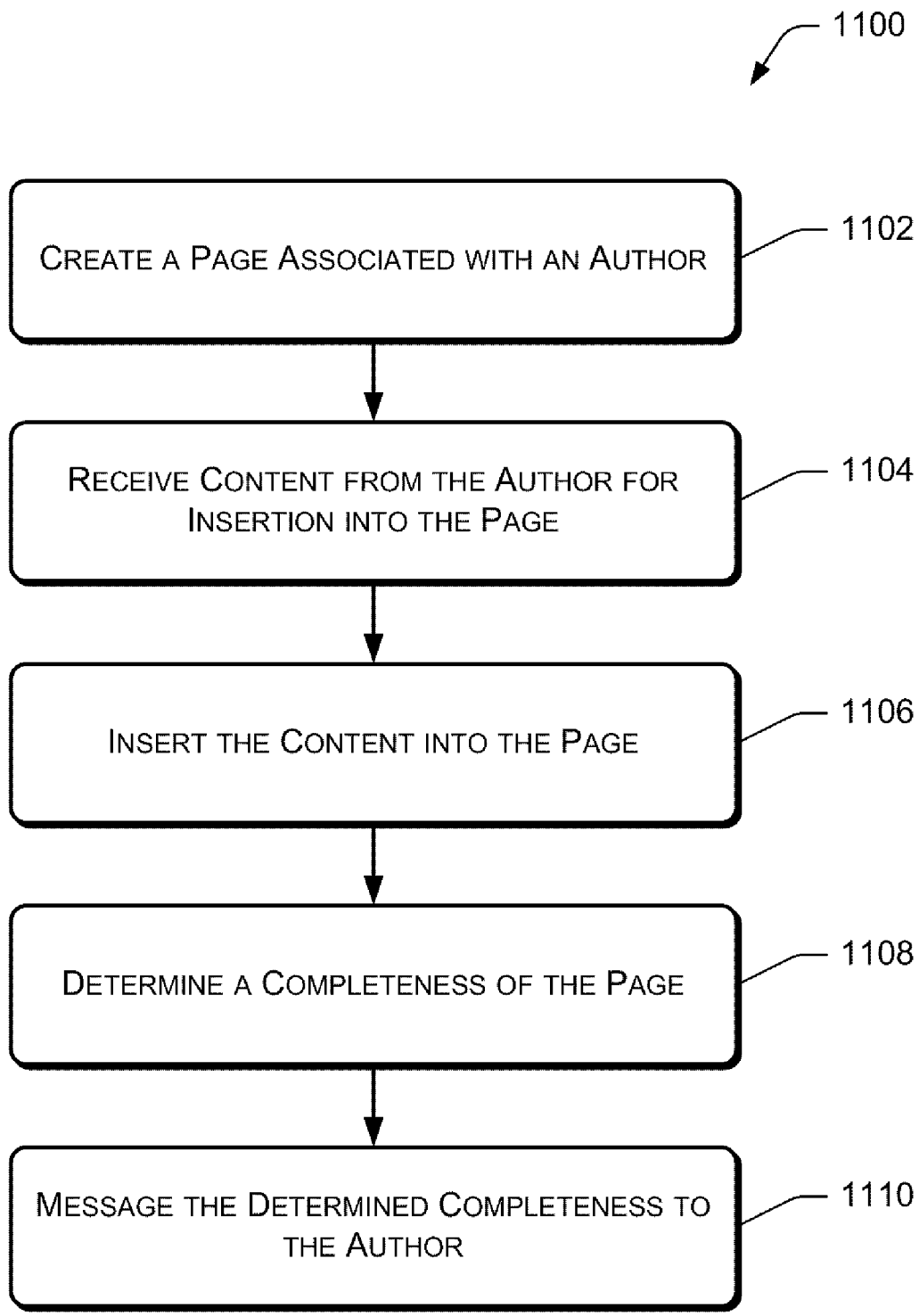

FIG. 11, meanwhile, illustrates process 1100. This process includes operation 1102, which represents creating a page associated with an author and for consumption by a community of users. This page may comprise the author page 114(1) from FIG. 1 and, as such, may include information about a corresponding author. Next, operation 1104 receives content from the author for insertion into a particular field of the page. For instance, the author may provide biography information for insertion into the page at the request of the site 106 or the author-tool service 108.

Next, operation 1106 inserts the content into the particular field of the page responsive to the receiving of the content. Operation 1108 then determines a completeness of the page based on a number of fields of the page completed by the author relative to a total number of available fields of the page for completion by the author. For instance, if the page includes five fields and the author has provided content for four, then this operation may determine that that author has completed 80% of the page. Finally, operation 1110 messages the determined completeness of the page to the author in the manner shown in FIG. 3 or otherwise.

Figure 12:
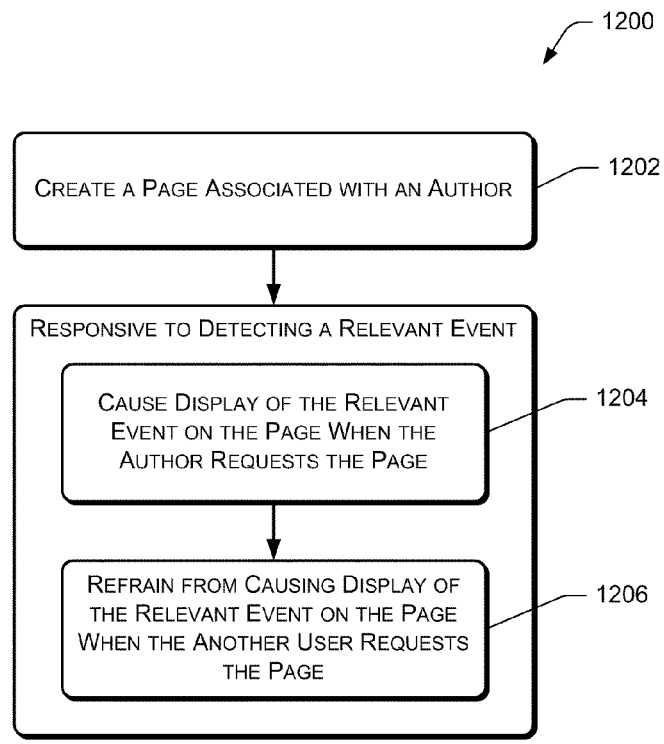

FIG. 12 illustrates a process 1200 that also includes creating a page associated with an author and for consumption by a community of users at operation 12002. Next, responsive to the detecting of an event that is relevant to the author or to a work of the author, operation 1204 causes display of the relevant event on the page associated with the author when the author or a user associated with the author requests the page. For instance, operation 1204 may display the relevant event as an alert as shown in FIG. 3. Operation 1206, however, refrains from causing display of the relevant event on the page associated with the author when a user other than the author requests the page. For instance, if the user 102(R) requests the author page associated with the author 102(1) "Diego Gonzalez", this operation refrains from including in the user interface the alerts shown in FIG. 3. In some instances, however, this operation may still provide the alert to some users other than the author 102(1) (e.g., other authors, agents of the author 102(1), or any other users determined systematically or randomly).

Figure 13:
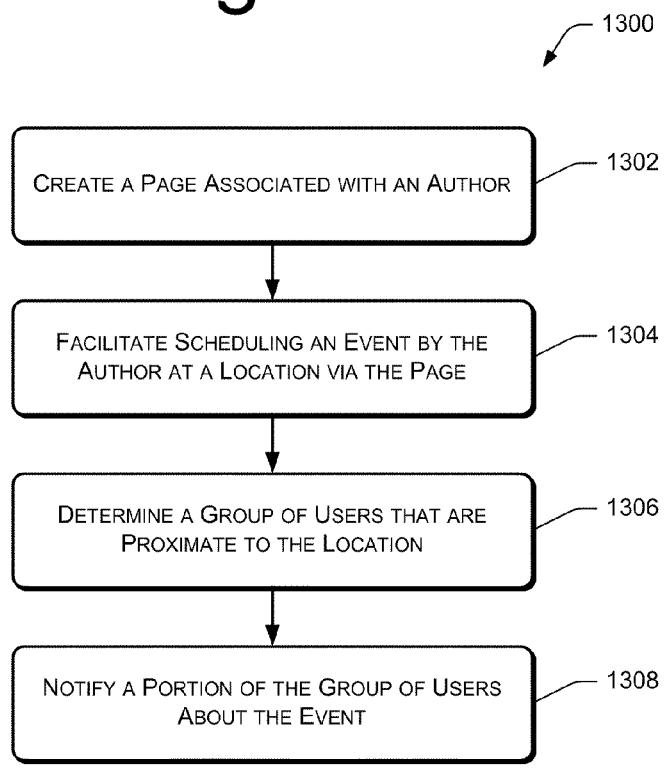

Finally, FIG. 13 illustrates process 1300. This process includes, at operation 1302, creating a page associated with an author and for consumption by a community of users. Next, operation 1304 facilitates scheduling of an event by the author or by a user associated with the author at a particular geographical location via the page associated with the author. For instance, the author 102(1) may schedule a book signing or other event via the map 402 of FIG. 4 or otherwise.

Responsive to the author scheduling the event, meanwhile, operation 1306 determines a group of users of the community of users that are proximate to the particular geographic location. For instance, this operation may determine users that are within fifty miles of the location of the event. Finally, operation 1208 notifies at least a portion of the group of users about the scheduled event. This operation may do so in a visual manner (e.g., via the user interface 600 shown in FIG. 6) or otherwise.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:

1. A system comprising:
   one or more processors;
   memory;
   an engine, stored in the memory and executable on the one or more processors, to:
      serve a user interface for display to an author of a work or a user associated with the author, the user interface indicating a geographical distribution of consumers that have conducted transactions associated with the work of the author; and
      facilitate scheduling of an event by the author or by the user associated with the author, the event being associated with the author or with the work by the author, the facilitating scheduling of the event including:
         enabling the author or the user associated with the author to select a geographical region at which to hold the event, the geographic region displayed within the user interface,
         based at least in part on the selection of the geographical region by the author or the user associated with the author, enabling the author or the user associated with the author to select a venue to host the event that is located in or is within a predefined distance of the geographical region, and
         based at least in part on the selection of the venue by the author or by the user associated with the author, scheduling the event at the venue selected by the author or by the user associated with the author.

2. A system as recited in claim 1, further comprising an author alert engine, stored in the memory and executable on the one or more processors, to notify the author of the work regarding an event that has occurred and that is associated with the work.

3. A system as recited in claim 1, further comprising a reviewer recommendation engine, stored in the memory and executable on the one or more processors, to recommend to the author a particular group of reviewers to review the work, the particular group of reviewers being selected at least in part based on attributes of the work or the author.

4. A system as recited in claim 1, further comprising an event notification engine, stored in the memory and executable on the one or more processors, to notify one or more users of a scheduled event associated with the work or the author, the one or more users being selected based at least in part on a location of the one or more users.

5. A system as recited in claim 1, further comprising a sales chart engine, stored in the memory and executable on the one or more processors, to:
   determine information associated with sales of the work;
   cause display of the information on a chart; and
   facilitate annotation of the chart by the author of the work.

6. A system as recited in claim 5, wherein the user interface and the chart are for display on a webpage that is associated with the author, and wherein the system further comprises a health-indication engine, stored in the memory and executable on the one or more processors, to message to the author a completeness of the webpage that is associated with the author.

7. A system as recited in claim 6, wherein the health-indication engine determines the completeness of the webpage based on a number of fields completed by the author relative to a total number of available fields of the webpage that is associated with the author.

8. A system as recited in claim 5, further comprising a forecasting engine, stored in the memory and executable on the one or more processors, to forecast a future demand for the work based at least in part on annotations on the chart provided by the author of the work.

9. A system as recited in claim 5, wherein the user interface and the chart are for display on a webpage that is associated with the author, and wherein the system further comprises:
   a health-indication engine, stored in the memory and executable on the one or more processors, to message to the author a completeness of the webpage that is associated with the author;
   an author alert engine, stored in the memory and executable on the one or more processors, to notify the author of the work regarding an event that has occurred and that is associated with the work;
   a reviewer recommendation engine, stored in the memory and executable on the one or more processors, to recommend to the author a particular group of reviewers to review the work, the particular group of reviewers being selected at least in part based on attributes of the work or the author;
   a forecasting engine, stored in the memory and executable on the one or more processors, to forecast a future demand for the work based at least in part on annotations on the chart provided by the author of the work; and
   an event notification engine, stored in the memory and executable on the one or more processors, to notify one or more users of a scheduled event associated with the work or the author, the one or more users being selected based at least in part on a location of the one or more users.

10. A method comprising:
under control of one or more computer systems configured with executable instructions, serving a user interface for display on a computing device of an author of a work or a user associated with the author, the user interface indicating a geographical distribution of consumers that have conducted transactions associated with the work of the author; and
    facilitating scheduling of an event by the author or by the user associated with the author, the event being associated with the author or with the work by the author, the facilitating scheduling of the event including:
        enabling the author or the user associated with the author to select a geographical region at which to hold the event, the geographic region displayed within the user interface,
        based at least in part on the selection of the geographical region by the author or the user associated with the author, enabling the author or the user associated with the author to select a venue to host the event that is located in or is within a predefined distance of the geographical region, and
        based at least in part on the selection of the venue by the author or by the user associated with the author, scheduling the event at the venue selected by the author or by the user associated with the author.

11. A method as recited in claim 10, wherein the transactions comprise acquiring the work of the author or requesting of a page associated with the author or with the work of the author.

12. A method as recited in claim 10, wherein the user interface comprises a map that indicates the geographical distribution of sales of the work by the author.

13. A method as recited in claim 10, further comprising:
    upon scheduling of the event by the author or by the user associated with the author:
    identifying a group of consumers that are within a predefined distance of a location of the scheduled event; and
    notifying at least a portion of the group of consumers that are within the predefined distance of the location about the scheduled event.

14. A method as recited in claim 13, wherein the at least a portion of the group of consumers comprises consumers that are associated with the work or with the author.

15. A method as recited in claim 10, wherein the work by the author comprises a book, an article, a song, a video or a piece of art.

16. A method as recited in claim 10, further comprising facilitating invitation of consumers by the author or by the user associated with the author.

17. A method as recited in claim 10, further comprising:
    responsive to the author or the user associated with the author scheduling the event:
    determining a group of consumers that are located within a predefined distance of a location of the event; and
    inviting the group of consumers to the event based at least in part on determining that the group of consumers are located within the predefined distance of the location of the event.

18. A method as recited in claim 10, further comprising:
    responsive to the author or the user associated with the author scheduling the event:
    determining a group of consumers that are associated with the author or the work of the author; and
    inviting the group of consumers to the event based at least in part on determining that the group of consumers are associated with the author or the work of the author.

19. A method as recited in claim 18, wherein the determining that the group of consumers are associated with the author or the work of the author comprises determining that consumers of the group of consumers have previously acquired: (i) the work of the author or another work of the author, or (ii) a work that has been deemed similar to the work of the author or to another work of the author.

* * * * *